United States Patent [19]

Scheurer et al.

[11] Patent Number: 4,897,063
[45] Date of Patent: Jan. 30, 1990

[54] REACTION INJECTION MOLDED RECREATION BOARDS WITH SPACED RECTANGULAR REINFORCING RODS

[75] Inventors: Robert S. Scheurer; Kendal Hancock, both of Wichita Falls, Tex.

[73] Assignee: Wellington Leisure Products, Inc., Madison, Ga.

[21] Appl. No.: 798,066

[22] Filed: Nov. 14, 1985

[51] Int. Cl.$^4$ .............................................. A63C 15/00
[52] U.S. Cl. ...................................... 441/68; 156/197; 280/610; 441/74
[58] Field of Search ............. 441/68, 74, 67, 129–132; 114/357; 280/610; 156/197; 264/DIG. 83

[56] References Cited

U.S. PATENT DOCUMENTS

| | | | |
|---|---|---|---|
| 3,396,923 | 8/1968 | Windecker | 244/123 |
| 3,579,937 | 5/1971 | Lukens | 52/309.2 |
| 3,635,482 | 1/1972 | Holman | 280/610 |
| 3,733,380 | 5/1973 | Ishida | 264/45.2 |
| 3,736,609 | 6/1973 | Saucier | 441/68 |
| 3,738,675 | 6/1973 | Hashimoto | 280/610 |
| 3,740,301 | 6/1973 | Manning et al. | 441/68 |
| 3,880,092 | 4/1975 | Seeber et al. | 264/45.1 |
| 3,928,106 | 12/1975 | Molnar | 441/68 |
| 3,970,324 | 7/1976 | Howat | 280/610 |
| 4,029,037 | 6/1977 | Hogan | 264/45.5 |
| 4,122,203 | 10/1978 | Stahl | 428/309 |
| 4,135,732 | 1/1979 | Magnus | 280/610 |
| 4,208,368 | 6/1980 | Egli | 264/45.5 |
| 4,250,585 | 2/1981 | Theriault et al. | 441/68 |
| 4,276,844 | 7/1981 | Fremont | 114/357 |
| 4,330,494 | 5/1982 | Iwata et al. | 264/46.2 |
| 4,386,982 | 6/1983 | Weinhaus | 441/68 |
| 4,486,368 | 12/1984 | Hancock | 264/46.7 |

FOREIGN PATENT DOCUMENTS

| | | | |
|---|---|---|---|
| 278566 | 2/1970 | Fed. Rep. of Germany | 441/68 |
| 88564 | 2/1975 | Japan | 264/46.7 |
| 49953 | 3/1984 | Japan | 264/46.7 |

Primary Examiner—Sherman D. Basinger
Assistant Examiner—Jesûs D. Sotelo
Attorney, Agent, or Firm—Dennis T. Griggs

[57] ABSTRACT

A reaction injection molded recreation board with spaced rectangular reinforcing rods. The rods are rectangular in cross section and are disposed between upper and lower surfaces of the board. Position clips maintain the reinforcing rods in mutually spaced relationships within an injection mold during the process of injecting foam plastic. The structure of the positioning clips is also disclosed.

11 Claims, 3 Drawing Sheets

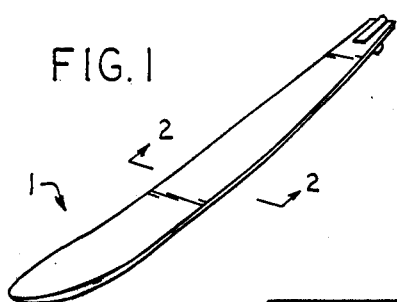
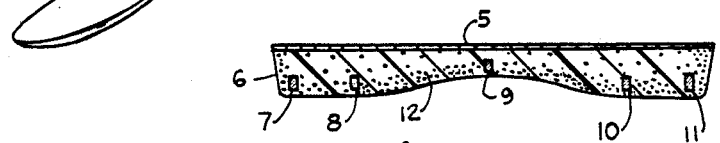
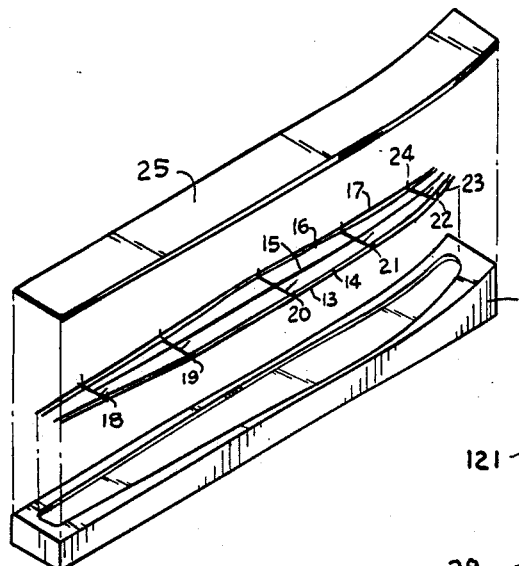
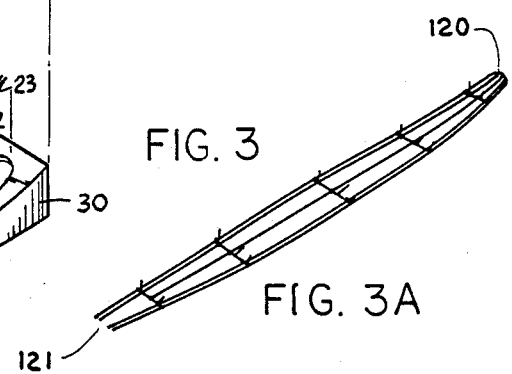
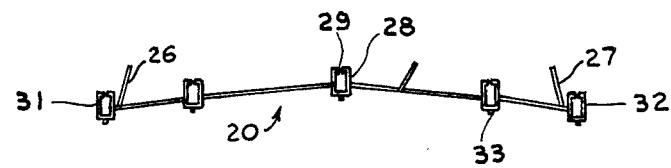
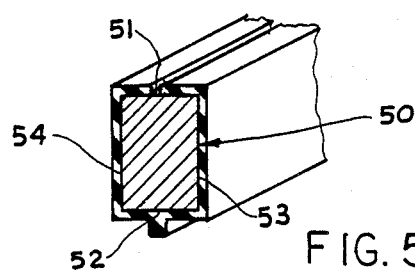
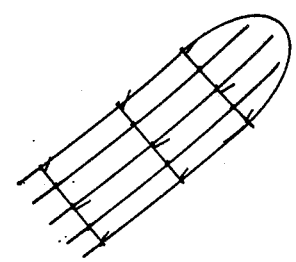

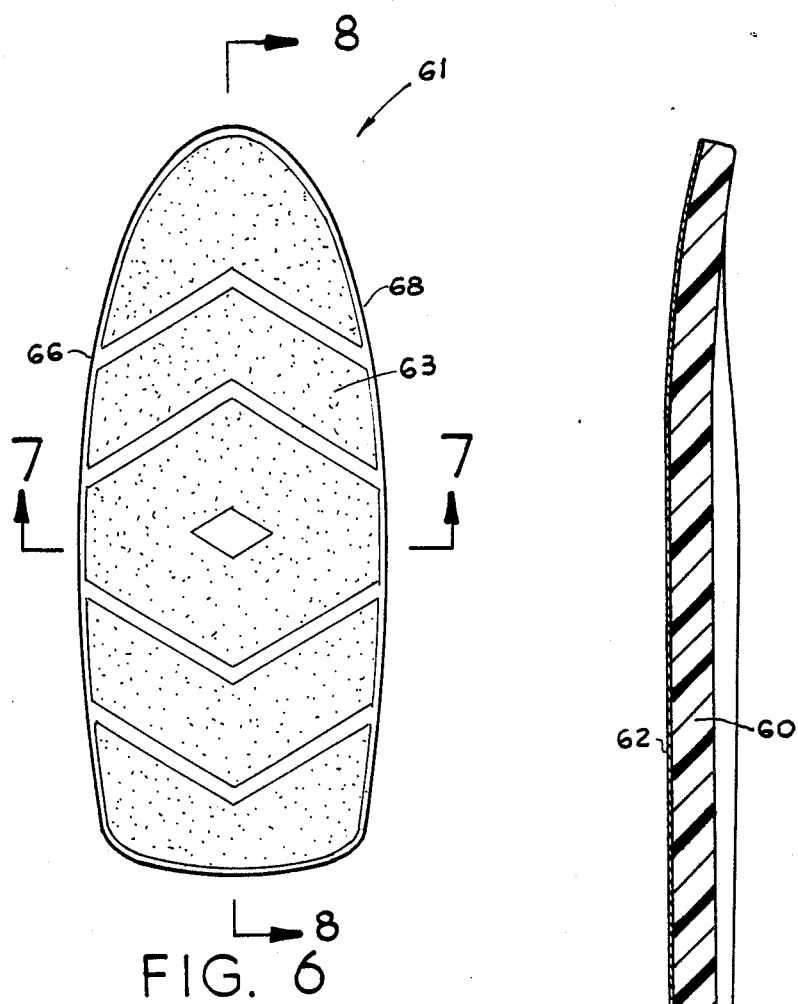
FIG. 6
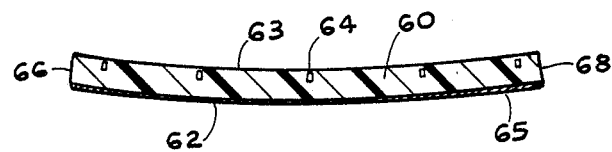
FIG. 7
FIG. 8

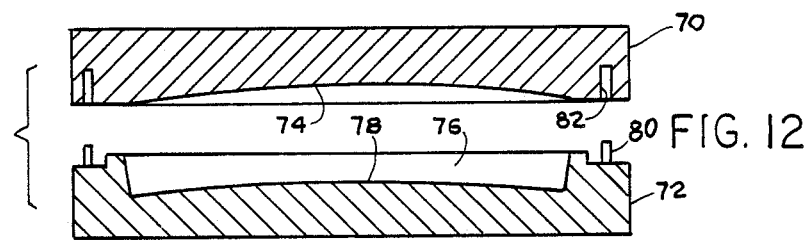
FIG. 12
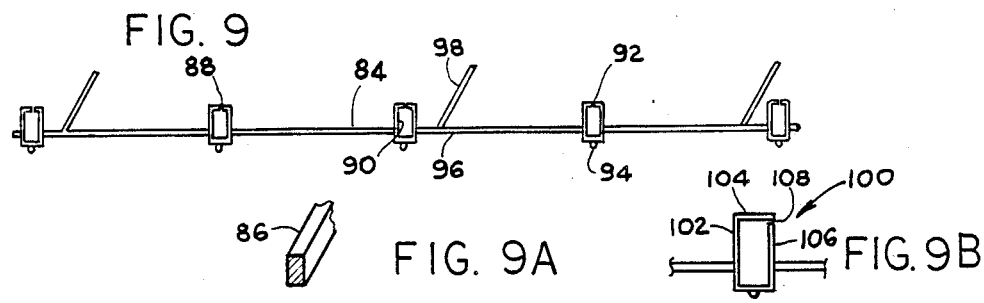
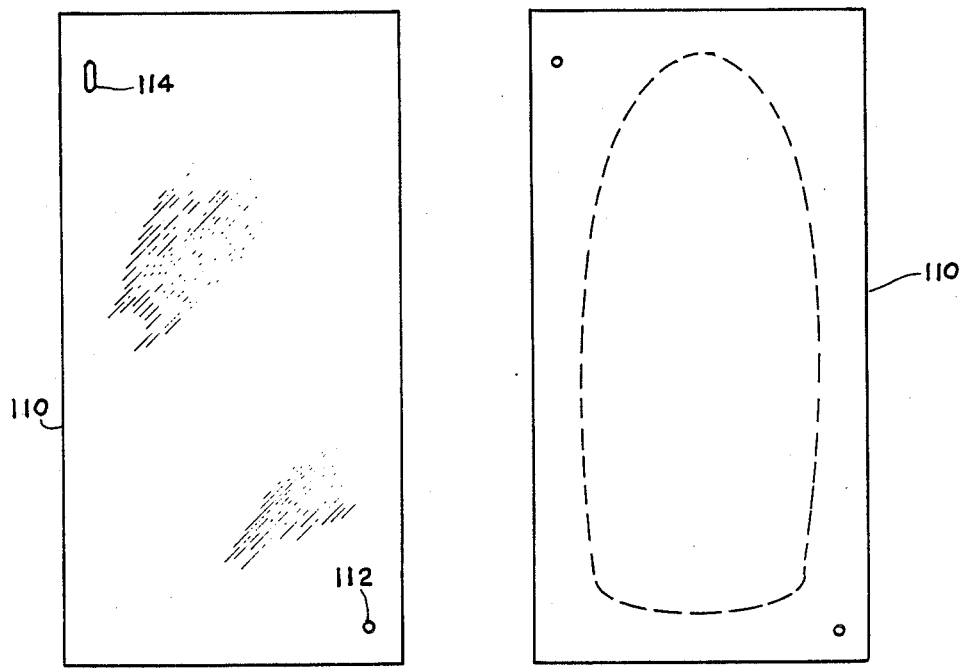
FIG. 10     FIG. 11

REACTION INJECTION MOLDED RECREATION BOARDS WITH SPACED RECTANGULAR REINFORCING RODS

BACKGROUND OF THE INVENTION

The invention relates to water skis skateboards, and the like. More in particular, the invention pertains to composite recreational board structures having a foam plastic body with reinforcing means disposed within the body, and adhered to the surface thereof.

It is known to use reinforcing means for recreational board apparatus used in water skiing, skateboarding, surfing and the like. As technology has advanced, lighter and more flexible materials have become available. It has become apparent that the lighter and more flexible the board material, the more important the reinforcing means becomes. Thus, the very lightest of material will require the very strongest of reinforcements to maintain support function. In keeping with the progression of creating stronger and lighter materials, the configuration of the reinforcing means becomes important. This is so because reinforcing means adds significant weight to the board apparatus and therefore can negate any advantage obtained from using lightweight plastic foam as a substantial portion of the board. When using steel rods as reinforcing means, a cross section must be used which provides the maximum amount of support while not adding any more weight to the overall structure than is necessary.

SUMMARY OF THE INVENTION

The invention is a composite recreation board apparatus for use in water skiing, skateboarding, surfing and the like. The preferred form is an injection molded plastic foam body with one surface being an aluminum plate or similar material bonded to a polyurethane foam body. The body is elongated and flat having upper and lower surfaces and being substantially longer than it is wide. Disposed between the upper and lower surfaces is reinforcing means.

It is preferred the reinforcing means be steel rods extending along the length of the body. The rods are encapsulated within the foam plastic during the manufacturing, and, in a preferred embodiment, the outside rod is in the shape of a U or loop substantially encircling the perimeter of the board close to the edge to provide a steel reinforced outer edge under the foam.

Also disposed and encapsulated within the plastic body are clips for positioning the steel rods during the manufacturing process. These clips are made of plastic, are elongated, and extend from side to side or along the width of the board. Situated along the clips are plural closed rectangular spaces for receiving the rods. Each rectangular space is split so that the steel rods may be placed within the spaces without having to insert the rods lengthwise through the spaces. These clips are important in the manufacturing process. It is preferred to use a mold for forming the board. Before any resin is added to the mold, the reinforcing rods are placed within the mold and held in mutually spaced relationships by way of the clips. When the mold is filled with injection reaction mixture, a situation which generates a lot of force, the clips maintain the rods within the mold such that the rods are advantageously maintained in an optimum reinforcing position for the finished board.

As the spaces and the clips are rectangular, so is the cross section of the reinforcing rods. The cross section of the reinforcing rod has a height greater than the width with the height being disposed between the upper and lower surfaces of the board apparatus. Rectangular cross sections are much preferred over circular cross sections because there is more compression and tension area for the reinforcing function with little or no portion of the reinforcing rod being functionless. Therefore, the goal of providing maximum reinforcement with minimum amount of material and weight is maintained.

Therefore, it is an object of the invention to provide reinforcing means having a greater compression and tension area yet being substantially less in mass.

It is also an object of this invention to create a lighter and stronger composite recreational board apparatus, with a stiffer flex at the same weight.

It is another object of this invention to use reinforcement rods that have rectangular cross sections rather than circular cross sections.

It is another object of this invention to provide reinforcement rods which have a flat surface for both compression and tension in the reinforcing function, wherein said flat surfaces are parallel to the board apparatus upper and lower surfaces.

It is still another object of this invention to provide means for maintaining reinforcing means within a preferred disposition within plastic foam.

It is still another object of this invention to have clips for maintaining reinforcing rods within specific locations within cured polyurethane foam wherein said clips have closed rectangular spaces, the corners of which hold the reinforcing rods fast.

These and other and further objects and features of the invention are apparent in the disclosure which includes the above and below specification, claims and drawings.

BRIEF DESCRIPTION OF THE DRAWINGS

FIG. 1 is an elevated perspective of a recreational board apparatus.

FIG. 2 is a cross section of FIG. 1 taken along line 2—2.

FIG. 3 is an elevated exploded perspective showing the disposition of reinforcing rods and holding clips.

FIG. 3A is another embodiment of the reinforcing rods.

FIG. 3B is another embodiment of the reinforcing rods.

FIG. 4 is a front plan view of the clip.

FIG. 5 is a cross section of a reinforcing rod in a receiver opening of a clip.

FIG. 6 is a top plan view of a skateboard constructed according to the invention.

FIG. 7 is a section taken along line 7—7 of FIG. 6.

FIG. 8 is a longitudinal cross section taken along line 8—8 of FIG. 6.

FIG. 9 is a cross-sectional view of the first and second mold halves used to construct the skateboard shown in FIGS. 1-7.

FIG. 9A is a detail of the rectangular rod.

FIG. 9B is a detail of an alternate dip.

FIG. 10 is a detail of the flat reinforcing sheet before being inserted in the mold.

FIG. 11 is a plan view of the mold shown in FIG. 8.

FIG. 12 is an end elevation of a clip used to support longitudinally extending reinforcement elements in the mold cavities.

DETAILED DESCRIPTION OF THE PREFERRED EMBODIMENT

Shown in FIG. 1 is a recreational board apparatus. It should be understood that a board constructed according to the invention may be used for skiing, skateboarding, surfing, or any related activity wherein a surface is used to support at least a portion of the human form. FIG. 2 shows a cross section of FIG. 1 wherein is located a surface plate 5, injection resin foam mixture 12, steel reinforcing rods 7, 8, 9, 10, and 11 with the injection resin foam forming sides as is represented by the number 6. FIG. 2 does not represent any preferred orientation in space. That is to say, plate 5 may be located on the bottom or vice versa. It is preferred that plate 5 be of aluminum or similar alloy. The reinforcing rods 7, 8, 9, 10, 11 are preferred to be steel or similar alloy. It is preferred the injection resin foam 12, 6 be polyurethane. It should be understood, however, that other foam plastic materials may be used wherein there is a resin, hardener and blowing agent.

FIG. 3 shows the method of manufacture.

There is mold 30 having located therein a cavity. Situated within mold 30 are steel reinforcement rods 13, 14, 15, 16 and 17. These rods extend lengthwise throughout the mold cavity. Maintaining the rods in three dimensional space within the mold are clips 18, 19, 20, 21, and 22. Situated on top of the mold containing the reinforcing rods and clips is plate 25 which is an aluminum plate or second mold and will form either an upper or lower surface of the board apparatus once the finished product is made. It is preferred to assemble the apparatus substantially as shown in FIG. 3 with the reinforcing rods within the mold cavity and the plate 25 situated on top of the mold whereupon an injection reaction mixture is injected into the cavity filling voids and spaces and hardening. After hardening, plate 25 is lifted off the mold with the depending foam structure and shaped to the contours of a desired board shape.

As shown in FIG. 3, the outside rods, 13 and 17 may be separate pieces, or in the alternative may be joined at the end 120 to from a U-shaped single piece which would add support to the tip of a finished product. The alternative embodiment is shown in FIG. 3A.

Referring again to FIG. 3, opposite end 121 shows the four outer rods ending at the same distance, while middle rod 15 ends at a point spaced inwardly from the other rods to allow for provision of a tail piece. The four outer rods are intended to end at a point spaced inwardly from the mold wall so that the rods are not exposed after molding.

FIG. 3B shows another embodiment of the rod structure wherein the two outer rods are joined to form a U-shaped single piece. The opposite end shows all five rods ending at the same point for instances where tail pieces are not required, such as in the manufacture of skateboards.

At any time when the U-shaped embodiment is used, a single rod is bent into the desired shape. Bending rectangular rods has several advantages over bending conventional round rods. For instance, in the manufacture of skateboards, the tail section may be angled upwardly as much as 30 degrees. Therefore, the rod will have to be bent in two different planes. After bending, the bent structure must be placed into the mold and held into exact position prior to molding. For conventional round rods, there is a tendancy to turn even while in clips such that the rods become misalligned. The present invention obviates this problem since the rectangular rods are held in place in the clips without turning.

Moreover, the rectangular shape tends to provide a higher strength to weight ratio than conventional round rods.

Another advantage to the use of rectangular rods is the fact that making the U-shaped bend becomes easier because the rods tend to bend in a single plane, while for round rods, the bend tends to be erratic and skewed.

FIG. 4 is an enlarged view of the clips 18, 19, 20, 21, and 22 of FIG. 3. A clip 20 as shown in FIG. 4 extends along the width of the mold cavity 30. Nipples 33 rest along the bottom of the mold and projection-like members 26 and 27 are weighted down by plate 25 in the manufacturing assembly of FIG. 3. Reinforcement rods extend through rectangular spaces 28. The rectangular space 28 is provided with a split 29 so that the reinforcement rods do not have to be threaded through rectangular spaces 28 but may be placed within rectangular space 28 by bending apart the space and inserting the rod. This clip is crucial in maintaining the reinforcement rods in position within the composite board structure as the plastic foam hardens. The assembly of FIG. 3 is readied for addition of the resin mixture by securing the clips and reinforcement rods within the mold cavity and placing the plate 25 down tightly upon the mold whereupon a resin foam reaction mixture is injected into the mold cavity and sets up. The act of injecting and setting up can be violent and without the clips the reinforcing rods would become disoriented and dislocated within the mold.

FIG. 5 shows a reinforcing rod cross section. Surfaces 51 and 52 are parallel to upper and lower surfaces of the recreational board apparatus shown in FIG. 1. As can be seen, the distance between surface 51 and 52 is substantially greater than the distance between surface 53 and 54. The principal advantage of the rectangular cross section over a circular cross section is that surface 51 and 52 provide greater surface area for compression and tension when weight is applied to surface 51 than would occur if the cross section were circular. This is because contact with a circular cross section would be to points as opposed to a surface extending along the rod. Moreover, the width of reinforcing rod 50 would be less than that of a circular reinforcing rod and thus lighter.

FIG. 5 shows the preferred cross section of the reinforcing rods. The cross section is indicated generally by the number 50. Compression from the weight of a human is exerted on surface 51 which causes tension on surface 52. It is preferred to have these surfaces 51 and 52 be flat and not rounded so as to provide more compression and tension surface. If these surfaces were rounded less area would be provided for compression and consequent tension due to weight support.

One embodiment has surfaces 53 and 54 being 0.016" long and surfaces 51 and 52 being 0.08" long.

In a preferred embodiment, the rods are roller or dip coated with an aqueous polyurethane 40% dispersion coating which is allowed to air dry before insertion of the rods in molds.

As shown in FIGS. 6–12, the skateboard 61 is made of an upper body portion 60 and a reinforcing lower sheet 62. The reinforcing lower sheet 62 has an upper surface which is permanently bonded to the lower surface of the upper body portion 60. Reinforcing bars 64 spaced slightly downward from the upper surface 63 extend through the upper body 60 in a direction generally parallel to the lateral edges 66 and 68.

In a preferred embodiment, the reinforcing elements 64 are steel bars and the reinforcing sheet 62 is an aluminum sheet. Alternatively, the reinforcing elements 64 may be made of some other high tensile strength material which is compatible with the material of the body 60. The reinforcement sheet 62 may be made of some material other than aluminum, for example, fiber reinforced plastic. The aluminum sheet is preferred since it provides the requisite strenght in conjunction with the reinforcing bars 64, and the aluminum provides a surface which may be bent in the compound curve as required of the lower surface and which may provide a surface for decoration.

Curvature of the upper surface 63 and the lower surface 65 varies according to the particular spacing between front edge and rear edge.

The center of the board is thicker than the corresponding edge portions. This is particularly pronounced in the areas near edges 68 and 68 to provide wheel clearance at the edge portions.

As shown in FIG. 8, besides being curved across the board, the board is also curved upward at its forward and rearward portions.

In the preferred method of construction shown in FIG. 12, the board is formed in two mold halves 70 and 72. The upper mold half has a relatively shallow concave cavity 74. The lower mold half has a relatively deep cavity 76 with a convex lower surface 78. Pins 80 on the lower mold half extend into openings 82 on a upper mold half to positively locate the mold halves.

Clips 84, such as shown in FIG. 9, hold the reinforcement elements 64 in position during the molding. The clips 84 become part of the upper body 60.

Three or more of the clips may be used.

First the rods 86 are snapped through openings 88 into the holders 90 in the clips. The openings 90 have corners 92 which prevent outward movement of the rods 86 through the openings 88 during the molding operations.

Knobs 94 at the bottoms of the holders 90 space the holders 90 and rods 96 a precise distance apart, and spring levers 98 push the connectors 96 and holders 90 downward in the mold during the reaction injection and hardening process.

In an alternate embodiment, shown in FIG. 9B, clips 100 have receivers 102 with tops 104 which extend over opposite sides 106, leaving slits 108 through which rods 86 are admitted. The tops 104 provide a positive hold down of the rods during molding.

A previously decorated reinforcing sheet 110, as shown in FIG. 10, is placed on a rim of the mold cavity 76, with the hole 112 engaging one pin 80 and the slot 114 engaging another pin. The slot 114 permits slight longitudinal movement of the sheet while preventing lateral movement of the sheet.

After the sheet 110 is placed on the pins 80, the mold halves are closed. The sheet presses downward against elements 98 of the clips 84, pushing the clips against surface 78.

The reaction injection molding products are injected into cavity 76, and expansion of products rapidly presses the sheet 110 upward against the concave surface of cavity 74 in mold half 70. Springs 98 continue to push the clips 84 downward. The high pressure in the mold cavity permanently bonds the reaction injected material to the inner surface of the sheet 110. After the mold halves are separated and the skateboard blank is removed, the sheet 110 is trimmed to the final skateboard shape.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents, are therefore intended to be embraced by those claims.

What I claim is:

1. Board apparatus for water skis, skateboards and recreational boards, comprising:
   (a) an elongated flat plastic planar member having a greater length than width and having upper and lower surfaces for supporting at least a portion of a human, one of the upper and lower surfaces being an aluminum plate joined to the plastic member, and said plastic member being a body of polyurethane foam;
   (b) rectangular reinforcing rods extending substantially through the length of said planar member wherein said rods have rectangular cross sections with greater heights than widths, and wherein said rods are oriented within the plastic member with the heights of said cross sections aligned generally transversely to the upper and lower surfaces; and,
   (c) clips encapsulated in the polyurethane foam for holding the rods within the foam during manufacturing.

2. The apparatus of claim 1 wherein said clips have rectangular receivers to receive the rods and wherein the receivers have slits to allow placement of the rods without having to thread the rods through the clips.

3. The apparatus of claim 2 wherein the receivers have tops, sides and bottoms and wherein the tops are centrally divided by the slits.

4. The apparatus of claim 2 wherein said clips extend substantially through the width of said plastic member.

5. The apparatus of claim 4 wherein said heights of said cross sections of said rods are at least about two times said widths of said cross sections of said rods.

6. The device of claim 8 wherein the rods have at least 1 outer U-shaped rod substantially reinforcing a perimeter of said board.

7. The device of claim 6 wherein the rods have at least 1 interior rod situated within the U-shaped rod.

8. A deck for use in water skis, skateboards and recreational boards, comprising:
   (a) a flat elongated reaction injection molded board having upper and lower surfaces one of which is an aluminum plate bound to said board, said board having a greater length than width;
   (b) plural reinforcing rods extending substantially along the length of said board and being disposed between said upper and lower surface, said rods having rectangular cross sections with greater heights than widths, said rods having upper and lower surfaces parallel to the upper and lower surfaces of the board;
   (c) plastic clips having plural rectangular receivers for receiving said rods, said clips extending along the width of the board and being disposed between the upper and lower surfaces, said rectangular receivers being split to allow placement of the rods without having to thread them through the clips.

9. A board for use in water skis and skateboards comprising, in combination:
a foam plastic body having a greater length than width and having upper and lower surfaces;
reinforcing means extending along the length of said body and being located between said upper and lower surfaces, said reinforcing means having generally flat upper and lower surfaces disposed in parallel with said upper and lower surfaces of said body;
said reinforcing means including plural steel rods of rectangular cross section;
said rectangular cross section having a greater height dimension than width dimension, and wherein said rods are positioned within said body with the height dimension of each rod extending transversely relative to said upper and lower surface of said body;
said foam plastic body comprising reaction injection molded foam;
an aluminum plate bonded to one of the upper and lower surfaces of said body; and,
clip means disposed within said body, said clip means having plural rectangular recesses for holding said reinforcing rods positioned in precise orientation between said upper and lower surfaces of said body during manufacturing.

10. A board as defined in claim 9, wherein said clip means extends along the width of said body and has been closed rectangular receivers for receiving said reinforcing rods and wherein said closed rectangular receivers are split to allow insertion of the reinforcement rods into said recesses.

11. A board as defined in claim 9, each reinforcing rod having a cross sectional height of about twice its cross sectional width.

* * * * *

UNITED STATES PATENT AND TRADEMARK OFFICE
CERTIFICATE OF CORRECTION

PATENT NO. : 4,897,063

DATED : January 30, 1990

INVENTOR(S) : Robert S. Scheurer, Kendal Hancock

It is certified that error appears in the above-identified patent and that said Letters Patent is hereby corrected as shown below:

```
Column 1, line 7 "skis skateboards" should be -- skis,
skateboards --.

Column 5, line 11, "strenght" should be -- strength --.

Column 8, line 12, delete "been".
```

Signed and Sealed this

Eighth Day of January, 1991

Attest:

HARRY F. MANBECK, JR.

*Attesting Officer*  *Commissioner of Patents and Trademarks*